United States Patent [19]
Walton

[11] Patent Number: 5,291,789
[45] Date of Patent: Mar. 8, 1994

[54] LOAD INDICATING

[75] Inventor: Brian Walton, Dudley, England

[73] Assignee: RotaBolt Limited, England

[21] Appl. No.: 820,581

[22] PCT Filed: Jul. 17, 1989

[86] PCT No.: PCT/GB89/00819

§ 371 Date: Jan. 17, 1992

§ 102(e) Date: Jan. 17, 1992

[87] PCT Pub. No.: WO91/01484

PCT Pub. Date: Feb. 7, 1991

[51] Int. Cl.⁵ ............................................. F16B 31/02
[52] U.S. Cl. ........................................................ 73/761
[58] Field of Search .................... 73/761, 768; 340/665, 340/668; 116/212, 281–283, DIG. 34; 411/8–14, 916

[56] References Cited

U.S. PATENT DOCUMENTS

| | | | |
|---|---|---|---|
| 2,107,604 | 2/1938 | Friday | 73/768 |
| 2,446,427 | 8/1948 | Linder | 340/668 |
| 2,503,141 | 4/1950 | Stone | 340/668 |
| 2,600,029 | 6/1952 | Stone | 73/761 |
| 3,589,234 | 6/1971 | Trigg et al. | 411/8 |
| 3,696,412 | 10/1972 | Swanson | 73/761 |
| 3,802,379 | 4/1974 | Sandberg | 340/668 |
| 3,858,173 | 12/1974 | Ryan | 340/668 |
| 3,969,713 | 7/1976 | Bossler, Jr. | 73/761 |
| 4,041,776 | 8/1977 | Payne | 73/761 |
| 4,245,139 | 1/1981 | Orscheln et al. | 340/668 |
| 4,429,579 | 2/1984 | Wilhelm | 73/761 |
| 4,636,120 | 1/1987 | Brandsberg et al. | 73/761 |
| 4,921,380 | 5/1990 | Tronetti, Jr. | 411/9 |

FOREIGN PATENT DOCUMENTS 0926394  5/1982  U.S.S.R. ........................... 411/8

Primary Examiner—Robert Raevis
Attorney, Agent, or Firm—Kirschstein et al.

[57] ABSTRACT

For indicating when the tension in a bolt reaches a predetermined value, there is provided an electrical contact (24) which is held in a position adjacent to an axially facing surface (20) of the bolt and in a fixed position relative to a remote part of the bolt. Tightening of the bolt reduces the clearance between the contact and the surface of the bolt. When the clearance is eliminated, a bulb (27) is illuminated.

6 Claims, 4 Drawing Sheets

LOAD INDICATING

BACKGROUND OF THE INVENTION

This invention relates to devices for indicating the load to which a member is subjected.

The invention has been devised primarily for use in fasteners or other members which are to be subjected to a predetermined load and the invention is useful during initial loading of the member and subsequently for checking that the required load has been maintained.

SUMMARY OF THE INVENTION

According to the first aspect of the invention, there is provided a member having first and second electrically conductive elements which are anchored to or fixed with respect to respective portions of the member. which portions underto relative movement when the member is stressed, wherein, when the member is subjected to a first load, the conductive elements are in electrical contact or other first electrical relation with each other and wherein, when the member is subjected to a second load, the elements are out of electrical contact or otherwise out of the first electrical relation with each other.

At least one of the electrically conductive elements may be an integral part of the member. The other conductive element is preferably adjustable relative to the member during preparation of the member for use.

In the preferred member, the first electrically conductive element is fixed, during preparation of the member, with respect to a first portion of the member and is electrically insulated from the member, there is provided a carrier for the second electrically conductive element, the carrier is fixed with respect to a second portion of the member and retaining means is provided for limiting movement of the second element relative to its carrier so that the second element is anchored to the second portion of the member.

During use of the member, the electrical conductive elements are used to provide an electrical signal when the load to which the member is subjected rises above or falls below a predetermined level. The member may be stressed in tension or in compression during use.

The invention also provides a load indicator for providing a signal representing the load to which a member is subjected or for providing a signal when the member is subjected to a predetermined load, the indicator comprising first and second electrically conductive elements, respective carriers for the elements and means for maintaining the carriers in respective positions which are fixed with respect to respective portions of the member.

The electrically conductive elements are preferably arranged to be in electrically conductive contact with each other when the member is subjected to the first load and to be out of electrically conductive contact with each other when the member is subjected to the second load. Making and breaking of electrical contact between the element provides a signal indicating attainment of a predetermined load. If a continuously variable signal is required to represent any load to which the member is subjected within a predetermined range of loads, then the change in the capacitance between the electrically conductive elements are arranged to remain out of contact with each other through the load range within which indication is required. The elements may contact each other at one limit of this range.

It is known to provide mechanical indicating means for indicating when the tension in a fastener exceeds a predetermined value. One form of mechanical indicating means which has been proposed for use in a bolt is a rod which extends along a bore formed in the main body of the bolt from one end thereof. The rod is anchored to the main body at an inner end of the bore and carries a crosspiece which lies outside the bore. When the fastener is unstressed, the crosspiece projects from the main body. As the fastener is tightened, the main body is stressed and the crosspiece enters a transverse groove formed in the end face of the main body. When the stress in the main body exceeds a predetermined value, the crosspiece lies entirely within the groove and does not project from the main body. This form of indicating means is unsatisfactoy under conditions of poor visibility or when the crosspiece cannot be viewed in a direction perpendicular to a longitudinal axis of the bolt.

According to a third aspect of the present invention, a fastener which, in use, is subjected to a progressive increase is stress, is provided with indicating means which gives an electrical signal when the stress to which the main body of the fastener is subjected exceeds a predetermined value. The electrical signal can readily be used to provide a visual or audible signal or to control operation of a machine for tightening the fastener. The electrical signal may be the closing of an electrical circuit which includes a source of visible light, thereby providing a visual signal.

According to a fourth aspect of the invention, there is provided a method of tightening a fastener wherein an electrical signal is produced when the stress to which the fastener is subjected exceeds a threshold value.

According to a further aspect of the invention, there is provided a method of subjecting a member to a predetermined load wherein the member is provided with first and second electrically conductive elements which are fixed with respect to or anchored to respective portions of said member, said elements are incorporated in an electrical circuit having signalling means responsive to a substantial change in the electrical resistance or electrical capacitance between the elements and wherein the load on said member is increased until the signalling means provides a signal corresponding to the predetermined load.

BRIEF DESCRIPTION OF THE DRAWINGS

Examples of structures embodying the present invention and which includes members which are subjected to a predetermined load by a method in accordance with the invention will now be described, with reference to the accompanying drawings, wherein.

DETAILED DESCRIPTION OF THE PREFERRED EMBODIMENTS

Figure 1:
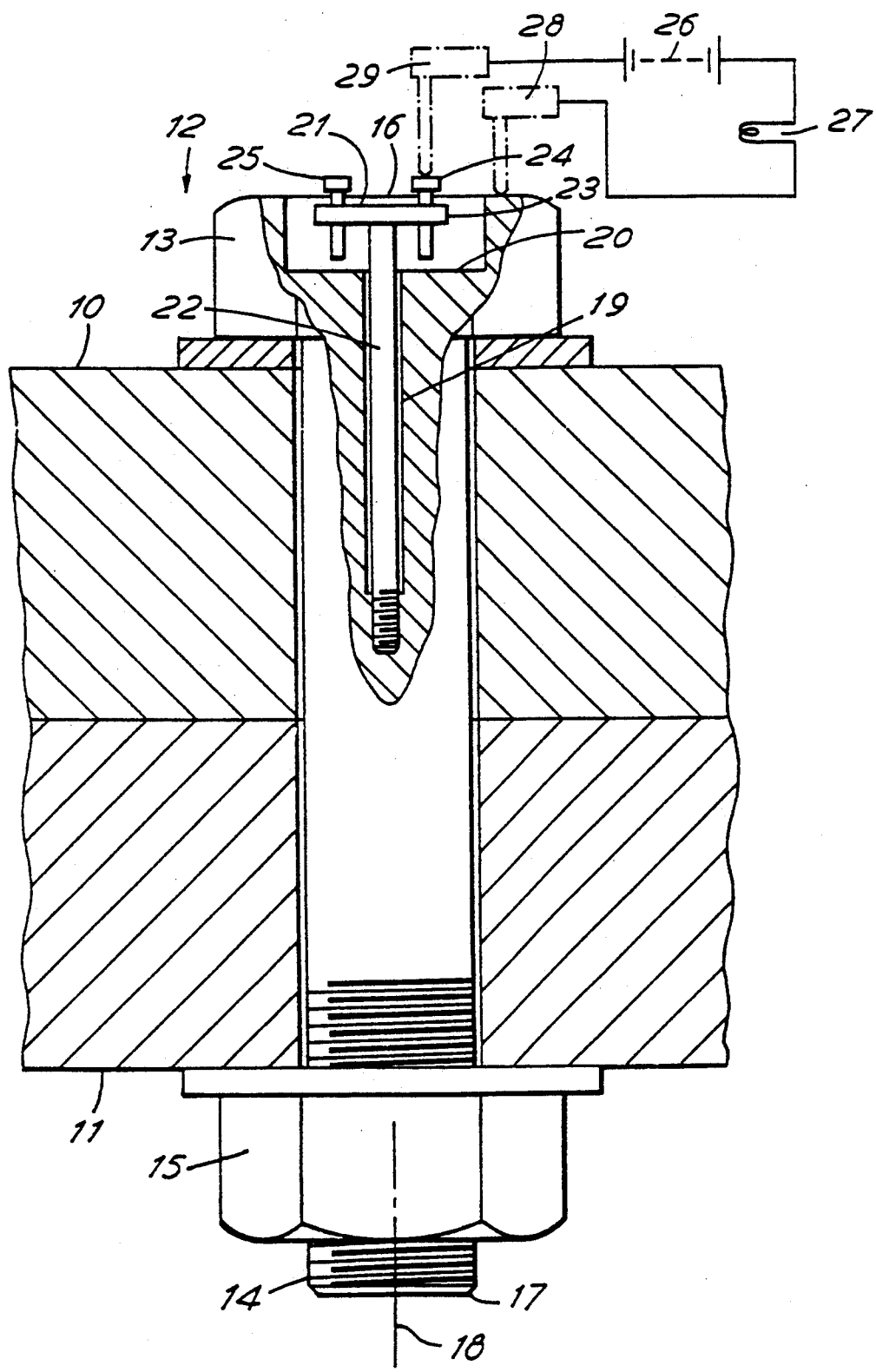
FIG. 1 illustrates a first structure partly in cross-section in a plane containing an axis of rotation of a fastener incorporated in the structure.

The structure illustrated in FIG. 1 comprises members which are to be fastened together. By way of example, these members are represented by a pair of flat members 10 and 11 in which there are formed respective, mutually aligned apertures to receive a fastener. The members 10 and 11 are fastened in face-to-face relation by the fastener and are subjected to compressive stress as the fastener is tightened, the fastener being subjected to tensile stress.

The fastener 12 is exemplified in FIG. 1 by a bolt having a head 13 adjacent to an exposed face of the member 10 and having a threaded portion 14 engaged with a nut 15 which lies adjacent to an exposed face of the member 11. The head and nut may act on the members 10 and 11 via respective washers. The fastener may have alternative forms. For example, the fastener may be a stud having a threaded portion at each of its ends for co-operation with respective nuts. Furthermore, a threaded portion of the fastener may co-operate with a thread formed in the member 11. The head 13 defines a central recess 16, an open mouth of which faces away from the threaded shank 17 of the bolt. Flats for co-operation with a driving tool (not shown) may be formed on the outside of the head or at the peripheral boundary of the recess 16. The recess 16 may be omitted, the head having a flat surface which faces away from the shank 17.

The head 13 and threaded shank 17 of the bolt together constitute a hollow main body of the fastener and define a longitudinal axis 18 of the fastener, which axis coincides with the axis of the thread 14. A bore 19 extends into the main body from a surface 20 of the head 13 which faces along the axis 18 in a direction away from the shank 17. In the example illustrated, this surface is a boundary surface of the recess 16, and the bore 19 extends along a part only of the length of the main body of the fastener. Typically the length of the bore is within the range 25 mm to 100 mm.

The fastener further comprises a plurality of electrical contact elements and a carrier 21 for these elements. The carrier includes a rectilinear stem 22 and a head 23 at one end of the stem. The head 23 is disposed in the recess 16 and is spaced somewhat from the surface 20 of the main body. The stem 22 extends from the head 23 along the bore 19. An end portion of the stem remote from the head 23 is anchored to the main body in a manner to prevent movement of that end portion of the stem relative to the adjacent portion of the shank 17. The end portion of the stem may be an interference fit in the bore 19. Alternatively, the end portion of the stem may be formed with a screw-thread engaged with a complementary thread provided in the bore. The stem may be screwed into the bore until an end of the stem abuts an end surface of the bore under pressure, so that the mutually engaged threads of the stem and main body are engaged under pressure and prevent inadvertent turning of the stem relative to the main body. There is preferably a small clearance between the remainder of the stem 22 and the boundary of the bore 19.

There is provided on the head 23 at least one electrical contact element. By way of example, two electrical contact elements 24 and 25 are shown in the drawing at diammetrically opposite positions with respect to the axis 18. Each of the contact elements 24 and 25 protrudes from the head 23 towards the surface 20 of the main body but, in the unstressed condition of the fastener, does not contact that surface.

Provision is made for adjustment of the contact elements 24 and 25 relative to each other and relative to the head 23, in order that the clearance between each contact element and the surface 20 can be set to a selected value. By way of example, each of the contact elements 24 and 25 is shown in the drawing as having the form of a screw engaged in a corresponding threaded bore formed in the head 23. Respective lock nuts are provided to lock the elements 24 and 25 in selected positions relative to the head 23. Alternatively, each contact element may extend through an unthreaded bore in the head 23 and be urged relative to that head in a direction towards the surface 20 by a spring, nuts being provided on the contact elements to limit the travel of each contact element under the action of its associated spring and thereby define a position of adjustment of the contact element.

Each of the contact elements 24 and 25 is formed of metal and is an electrical conductor. In the unstressed condition of the fastener, the contact elements are electrically insulated from the main body of the fastener, which is also formed of metal. The contact elements may incorporate respective insulating sleeves which engage the head 23 and lock nuts. Alternatively, the head 23 may be formed of an electrically insulating material. The stem 22 is preferably formed of a metal having the same co-efficient of thermal expansion as does the main body of the fastener.

That portion of the main body which presents the surface 20 constitutes a further electrical contact element of the structure, this further element being an integral part of the electrically conductive main body of the fastener.

The indicating means further comprises an electrically energisable signalling device and a source of an electrical potential difference, represented diagrammatically in the drawing as a battery 26. The signalling device may be an incandescent filament bulb 27. The bulb and the battery are connected in series with electrically conductive probes 28 and 29 suitable for making electrical contact with a selected one of the contact elements 24 and 25 and with the main body of the fastener. Whilst the fastener is unstressed, the electrical circuit remains open and the bulb 27 is not energised. An electrical potential difference is maintained between the selected contact element and the main body of the fastener, whilst the probes 28 and 29 are in their operative positions. As the fastener is tightened, the shank 17 is stretched relative to the stem 22 until the selected contact element engages the surface 20. The electrical circuit is thereby closed and the bulb 27 is energised.

Prior to use, the fastener may be subjected to a selected tensile stress and the contact element 24 then adjusted so that it just makes contact with the surface 20. The fastener may then be subjected to a different stress and the contact element 25 adjusted so that it just makes contact with the surface 20. During tightening of the fastener, the probe 28 can then be applied to the contact elements in turn to obtain visual signals indicating the attainment of two selected stresses in the main body of the fastener.

In a case wherein a single contact element is provided, the contact element may be fixed with respect to the head 21 and adjustment may be effected by screwing the stem 22 into or out of the bore 19.

Battery 26, bulb 27 and the probes 28 and 29 may be incorporated in a tool which is used in conjunction with successive fasteners. Alternatively, electrical components may be incorporated in each fastener so that the application of a separate tool for providing an indication when the tension in the fastener exceeds a predetermined value is unnecessary.

A cover may be provided for covering the contact elements 24 and 25 and a part of the head 23 except during tightening of the fastener.

The electrical circuit illustrated in FIG. 1 may be modified so that the bulb or other signalling device is not connected in series with the probes 28 and 29. For example, there may be connected in series with these probes an electrical device which is responsive to changes in the capacitance between the probes and which provides one or more electrical output signals dependant upon the capacitance between the probes. These output signals may be used to energise respective bulbs or other signalling means or to control the operation of a machine for tightening the fastener. It will be understood that the electrical properties of the interface between one of the electrical contact elements 24 and 25 and the surface 20 vary with variation in the pressure with which the contact element concerned engages that surface. Furthermore, as the contact element approaches that surface, the capacitance between the probes will change. The electrical circuit may include devices responsive to these changes and means may be provided for indicating the stress to which the fastener is subjected throughout a range of stress, so that the fastener can be tightened to any selected value within this range.

Figure 2:
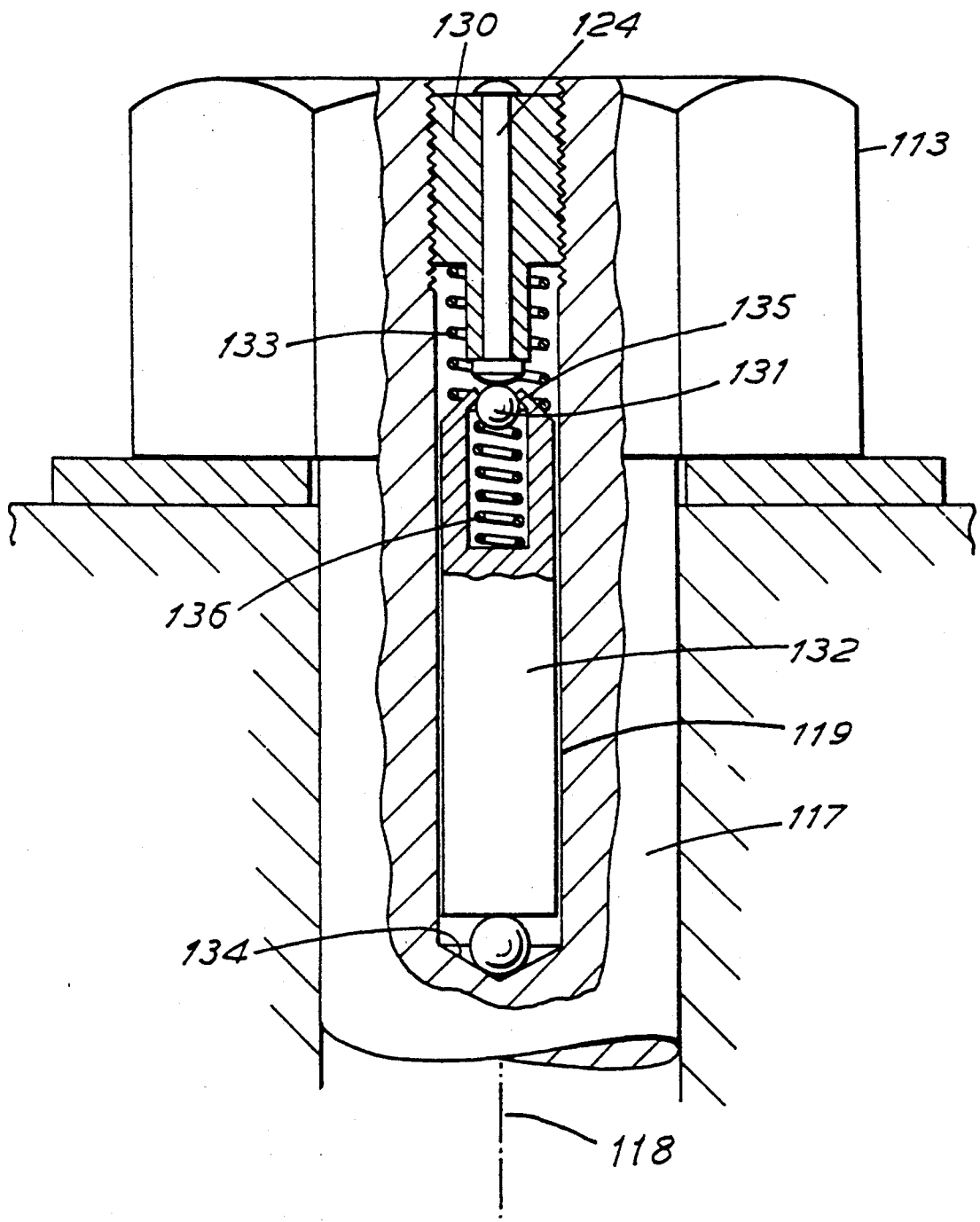
FIG. 2 illustrates a modification of the fastener of FIG. 1.

The modified fastener illustrated in FIG. 2 may be substituted for the bolt of FIG. 1. The fastener of FIG. 2 has certain parts corresponding to those hereinbefore described with reference to FIG. 1 and, in FIG. 2, such corresponding parts are identified by like reference numerals with the prefix 1. The preceding description is deemed to apply, except for differences hereinafter mentioned.

A first electrical contact element 124 of the fastener shown in FIG. 2 is mounted in an electrically insulating carrier 130. The electrical contact is preferably fixed with respect to this carrier. As shown in the drawing, the carrier may have a central bore through which a stem of the electrical contact extends, the contact also having at each of its ends an enlarged head so that the carrier is trapped between the heads. The carrier 130 is fitted into the bore 119 of the bolt in such a manner that the position of the contact element 124 along the axis 118 relative to an adjacent end portion of the bolt can be adjusted during preparation of the bolt and such that the contact element will then be fixed relative to the adjacent end portion of the bolt. This can conveniently be achieved as shown in the drawing by providing a screw thread in an end portion of the bore 119, screwing the carrier 130 into the bore to the required position and then locking the carrier in this position, for example by means of an adhesive or other bonding agent applied to the screw thread. The carrier 130 may be formed with a circumferential groove positioned between opposite ends of the screw thread and containing a suitable bonding agent.

The bolt of FIG. 2 is provided with a second electrical contact element 131 and with a carrier 132 for that contact element. Both the second element and its carrier are disposed inside the bore 119. The carrier 132 is elongated and occupies a major part of the length of the bore.

A coiled compression spring 133 is provided to anchor the carrier 132 with respect to an axially facing surface 134 of the shank 117 at the closed end of the bore 119. As shown in the drawing, the carrier may engage this surface through the intermediary of a ball. Alternatively, the carrier may engage this surface directly. The spring 133 acts between the carrier 132 and the carrier 130 to maintain the carrier 132 in firm engagement with the surface 134 at the closed end of the bore.

The second carrier 132 is hollow and the second electrical contact element 131 is disposed at least partly inside its carrier to protude from an open end of the carrier towards the electrical contact element 124. Retaining means 135 is provided to limit movement of the contact element 131 outwardly of its carrier. In the example illustrated, the retaining means is a lip provided around the open end of the carrier and projecting towards the axis 118 to define an opening having a diameter less than than of the contact element 131. In the example illustrated, the contact element is a ball. Alternatively, the contact element may have the form of a headed pin, the head being trapped inside the carrier 132 and the pin protruding from the carrier towards the contact element 124.

Biasing means is provided for biasing the second contact element 131 relative to its carrier 132 in a direction towards the contact element 124. In the example illustrated in FIG. 2, the biasing means is a coiled compression spring 136 contained with the carrier 132. Other forms of spring, for example a block of elastomeric material, may be provided.

The second carrier 132 provides an electrically conductive path from the second electrical contact element 131 to the main body of the fastener. The electrically conductive path preferably includes the surface 134. There may be a small clearance between the carrier 132 and the circumferential surface of the bore 119.

The bolt is prepared by drilling out the bore 119 and then forming the female screw thread adjacent to the outer end of that bore. The second carrier 132, together with the ball, if used, is inserted into the bore and the first carrier 130 is then screwed into the bore. Probes corresponding to the probes 28 and 29 are engaged with the first contact element 124 and with the head 113 of the bolt respectively, in order that a signal can be obtained when electrical contact is established between the contact element 124 and the contact element 131. The carrier 130 is screwed into the bore until electrical contact is just established between the contact elements. The carrier is then screwed a further, predetermined distance into the bore, this distance being determined according to the load which is intended to be imposed on the fastener and the modulus of elasticity of the fastener. It will be understood that, once contact between the contact elements 124 and 131 has been established, the contact element 131 will be moved along the bore with the contact element 124 relative to the second carrier 132. This relative movement will be accommodated by contraction of the spring 136. The distance through which the first carrier 130 and its contact element are moved after electrical contact has been established may be determined empirically by subjecting the bolt to the required load and adjusting the position of the carrier 130 just sufficiently to maintain electrical contact. Once this determination has been made, it can be used in the preparation of a number of identical bolts.

When the prepared bolt of FIG. 2 is unstressed, there is an electrical circuit from the first contact element 124 through the second contact element 131, the carrier 132, the shank 117 of the bolt and the head 113 of the bolt. The existence of this closed circuit can be detected in the same manner as described with reference to FIG. 1. If the bolt is then tightened, to subject the shank of the bolt to tensile stress, the surface 134 is moved further away from the head 113 of the bolt and therefore away from the first electrical contact element 124. The carrier 132 is caused to follow the movement of the surface 134 so that the spring 133 is permitted to extend again. If stretching of the bolt continues after the second electrical contact element 131 has engaged the retaining means 135, the circuit is opened and this is detected electrically.

Figure 3:
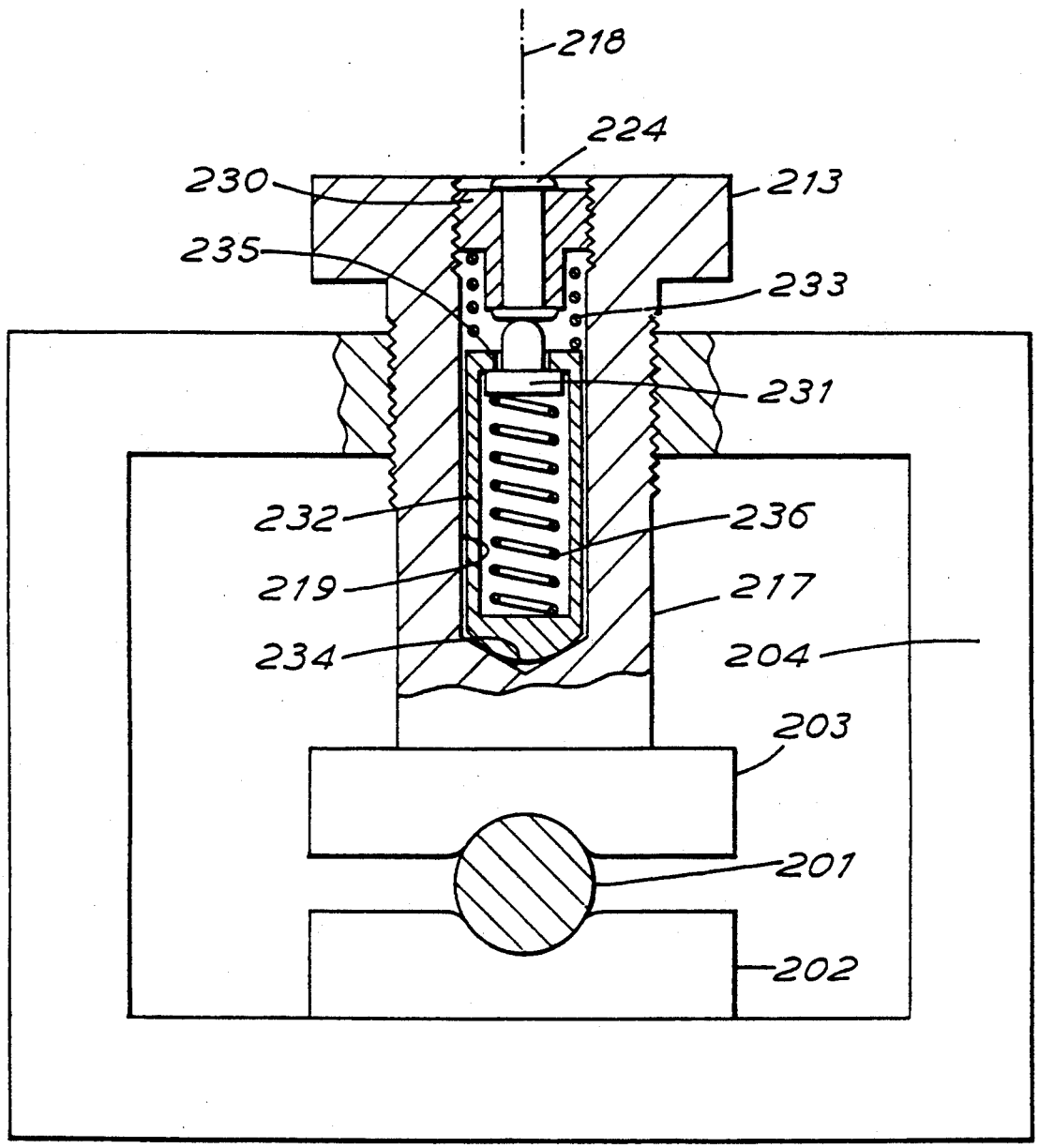
FIG. 3 illustrates a further structure embodying the invention.

In FIG. 3, there is illustrated a structure which includes a bolt having a shank 217 which is subjected to compressive stress, as the bolt is tightened. Certain parts of the structure shown in FIG. 3 correspond to parts hereinbefore described with reference to FIG. 2 and such corresponding parts are identified in FIG. 3 by like reference numerals with the prefix 2 substituted for the prefix 1 used in FIG. 2. The preceding description is deemed to apply to such corresponding parts, except for the differences hereinafter mentioned.

The bolt shown in FIG. 3 is used for clamping a member 201, for example a portion of cable, to a seat 202. The member 201 is clamped between the seat and a saddle 203. The seat is carried on a frame 204 which also carries the bolt. A threaded portion of the shank 217 of the bolt engages a threaded opening in the frame and a free-end portion of the shank bears against the saddle 203.

The bolt of FIG. 3 has first and second electrical contact elements 224 and 231 and has first and second carriers 230 and 232, which may be identical with those hereinbefore described with reference to FIG. 2. During preparation of the bolt of FIG. 3, the first carrier is screwed into the bore of the bolt until electrical contact between the contact element 224 and the contact element 231 is just established. The carrier 230 is then withdrawn to establish a predetermined clearance between the contact elements. This clearance is determined in accordance with the required load to be established in the bolt and the modulus of elasticity of the bolt.

When the bolt of FIG. 3 is unstressed, the electrical contact elements 224 and 231 are spaced apart and the circuit through the bolt is open. When the bolt is used to drive the saddle 203 towards the seat 202 to clamp the member 201, the shank 217 of the bolt is contracted and the carrier 232 is therefore driven towards the carrier 230 until electrical contact between the contact elements 224 and 231 is established. This condition is signalled in the manner hereinbefore described with reference to FIG. 1. If the bolt should inadvertently be tightened further, the second electrical contact element 231 will be driven further into the carrier 232, without damage being caused to internal components of the bolt. Turning of the bolt can then be reversed until the contact element 224 is withdrawn from the contact element 231 just sufficiently to open the circuit.

It will be understood that, in place of the signalling means represented in FIG. 1, there may be used with the bolt of FIG. 2 and with the bolt of FIG. 3 more elaborate signalling means as hereinbefore described, for example signalling means which provides a continuously variable signal representing the instantaneous load throughout a range of loads, for example to provide a digital display of the load. The signal may be applied to a microprocessor, for example to provide a record of the load. In a case where the signal is required to represent a range of loads, changes in capacitance may be used to provide the signal. It will be understood that, in a case where the change in the capacitance between the electrically conductive elements is used, electrical contact between these elements can be avoided. A layer of a dielectric could be provided between the conductive elements.

Figure 4:
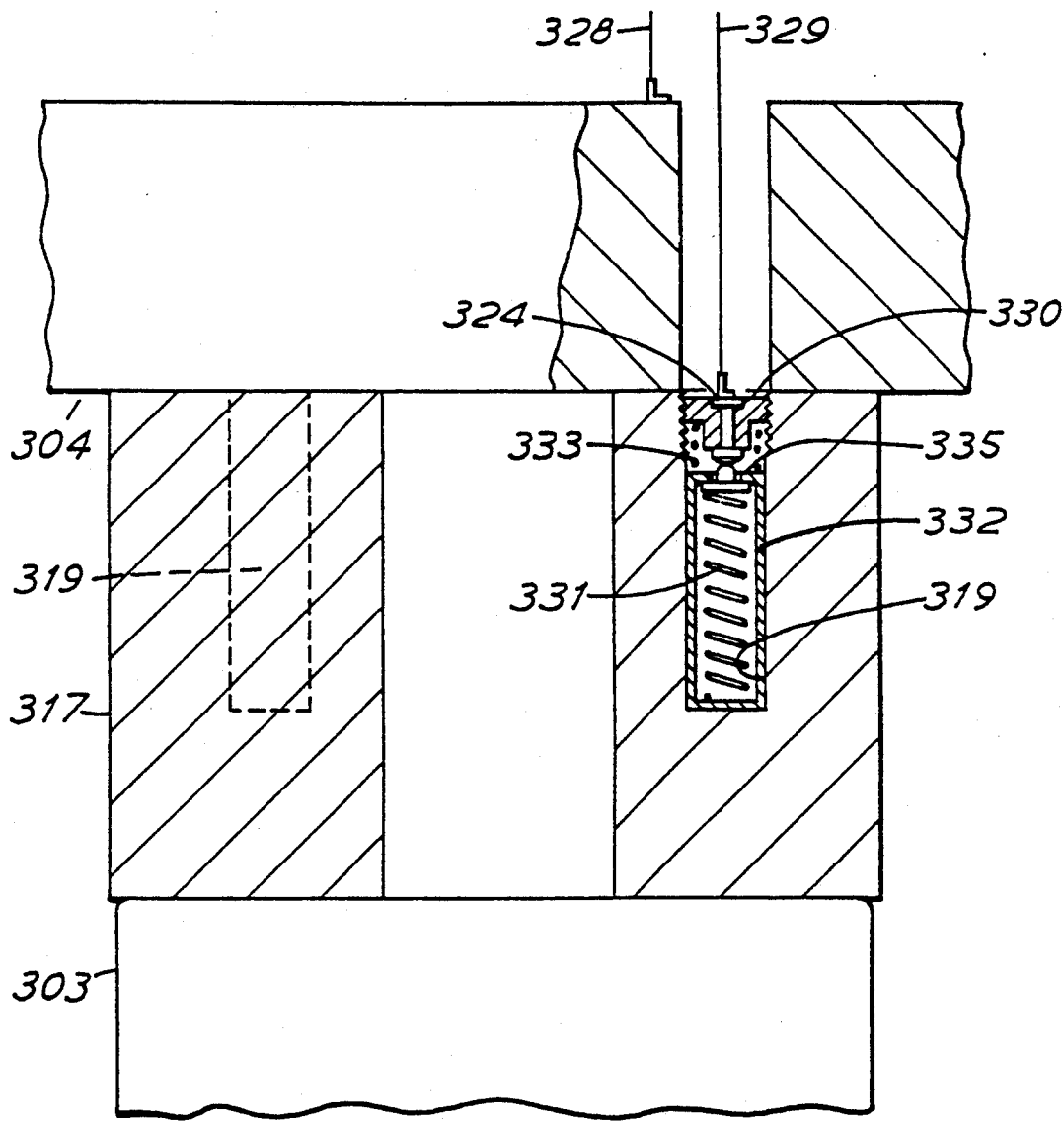
FIG. 4 illustrates a third structure embodying the invention.

The structure illustrated in FIG. 4 includes a member 317 which is interposed between an hydraulic cylinder 303 and a support 304 for that cylinder. When the cylinder is extended, the member 317 is subjected to compression and the stress to which the member is subjected varies with the hydraulic pressure in the cylinder. The cylinder may be used, for example, to clamp a further member to a seat in a manner similar to that in which the cable 201 is clamped to the seat 202.

The member 317 is conveniently of cylindrical form. Alternatively, as shown in FIG. 4, the member may be an annulus. A number of blind bores 319 are drilled into the member 317 from one end thereof. These bores are distributed evenly around an axis of the member, which is co-axial with the piston and cylinder unit 303. In a case where the member 317 is a cylinder, there may be a single bore provided at the axis. Each of these bores contains electrically conductive elements and carriers for those elements. The electrically conductive elements may be arranged in the same manner as are those hereinbefore described with reference to FIG. 2 or as hereinbefore described with reference to FIG. 3. A further alternative arrangement of the electrically conductive elements is illustrated in FIG. 4.

In each bore 319 of the member shown in FIG. 4, there is mounted a first, substantially rigid electrical contact element 324. This element is fixed with respect to a carrier 330 which is screwed or otherwise secured in an outer end portion of the bore. A hollow carrier 332 for a second electrical contact occupies an inner part of the bore and is urged towards the closed end of the bore by a spring 333. The second electrical contact element 331 is itself resilient and therefore does not require a spring corresponding to the spring 163. The contact element 331 occupies the interior of the carrier 332 entirely and is retained in the carrier by a lip 335.

An electrical conductor 329 extends from the first contact element 324 through an opening in the support 304 to other circuit components of signalling means (not shown) which may be any of the alternative signalling means hereinbefore described. The signalling means is also connected electrically with the member 317 via the support 304 and a further conductor 328.

The arrangement of the structure illustrated in FIG. 4 is such that, when there is no substantial hydraulic pressure in the cylinder 303, the contact element 324 in each bore is out of electrical contact with the associated contact element 331. As the hydraulic pressure in the cylinder is increased, the member 317 contracts elastically. The separation between the electrical contact elements is thereby reduced until electrical contact is established. The arrangement may be such that the signalling means provides an output signal only when an electrically conductive relation is established in all of the bores 319. Alternatively, respective signals obtained from each contact pair in the bores may be combined in some other way to provide an output signal.

It will be understood that, if an output signal representing a tensile load in the hydraulic cylinder is required, the member 317 may be so associated with the hydraulic cylinder and the support 304 as to be stressed in tension when the hydraulic pressure is increased. The electrical contact elements may be used in the manner hereinbefore described with reference to FIG. 2.

The members 117, 217 and 317 hereinbefore described are preferably formed of steel. The electrically insulating carriers are conveniently formed as mouldings of a plastics material. The electrical contact elements also may be formed as mouldings of a composition comprising electrically conductive particles in a matrix of a plastics material. It will be understood that the carriers and the contact elements are required to be formed of dimensionally stable materials, with the exception of the contact element 331, which is formed of a relatively resilient composition incorporating electrical conductive particles in a matrix of a plastics material.

I claim:

1. A hollow member having first and second electrically conductive elements which are anchored to or fixed with respect to respective portions of the member, which portions undergo relative movement when the member is stressed, characterised in that, when the member is subjected to a first load, the elements are in electrically conductive contact with each other at a position inside the hollow member, in that when the member is subjected to a second load, the elements are out of electrically conductive contact with each other, and the first element is electrically insulated from the hollow member and in that the first element is carried by a first carrier which is fixed with respect to the corresponding portion of the hollow member and is positioned within the hollow member.

2. A member according to claim 1, wherein there is provided a carrier for the second electrically conductive element, the carrier is fixed with respect to a second portion of the member, and retaining means is provided for limiting movement of the second element relative to its carrier.

3. A member according to claim 2, further comprising biasing means for biasing the second element relative to its carrier in a direction towards the first element.

4. A member according to claim 2, further comprising a resilient element urging the second carrier onto a seat formed in the hollow member.

5. A member according to claim 1, wherein the electrically conductive elements are so arranged that deformation of the member to establish and discontinue electrical contact of said elements with each other is within the elastic limit of the member.

6. A member according to claim 1, wherein said member defines an axis extending along the interior of the member, the second electrically conductive element is inside the member at an axially facing surface of the member, the first carrier extends into the member longitudinally of the axis, the first carrier is anchored to the member at a position spaced from said surface in a direction away from the first element and, when the member is unstressed, the first element is out of electrically conductive contact with the second element.

* * * * *